US005867666A

United States Patent [19]
Harvey

[11] Patent Number: 5,867,666
[45] Date of Patent: Feb. 2, 1999

[54] VIRTUAL INTERFACES WITH DYNAMIC BINDING

[75] Inventor: Andrew Harvey, San Jose, Calif.

[73] Assignee: Cisco Systems, Inc., San Jose, Calif.

[21] Appl. No.: 906,712

[22] Filed: Aug. 5, 1997

Related U.S. Application Data

[63] Continuation of Ser. No. 367,050, Dec. 29, 1994, abandoned.

[51] Int. Cl.$^6$ ..................................................... G06F 15/16
[52] U.S. Cl. ................................ 395/200.68; 395/200.53
[58] Field of Search ......................... 395/200.68, 200.53; 370/351, 401, 409

[56] References Cited

U.S. PATENT DOCUMENTS

| Re. 33,900 | 4/1992 | Howson | 370/105 |
|---|---|---|---|
| 4,131,767 | 12/1978 | Weinstein | 179/170.2 |
| 4,161,719 | 7/1979 | Parikh et al. | 340/147 SY |
| 4,316,284 | 2/1982 | Howson | 370/105 |
| 4,397,020 | 8/1983 | Howson | 370/105 |
| 4,419,728 | 12/1983 | Larson | 364/200 |
| 4,424,565 | 1/1984 | Larson | 364/200 |
| 4,437,087 | 3/1984 | Petr | 340/347 DD |
| 4,438,511 | 3/1984 | Baran | 370/19 |
| 4,439,763 | 3/1984 | Limb | 340/825.5 |
| 4,445,213 | 4/1984 | Baugh et al. | 370/94 |
| 4,446,555 | 5/1984 | Devault et al. | 370/94 |
| 4,456,957 | 6/1984 | Schieltz | 364/200 |
| 4,464,658 | 8/1984 | Thelen | 340/825.5 |

(List continued on next page.)

FOREIGN PATENT DOCUMENTS

| 0 384 758 A2 | 2/1990 | European Pat. Off. | H04L 12/56 |
|---|---|---|---|
| 0 431 751 A1 | 11/1990 | European Pat. Off. | H04L 12/46 |
| 0 567 217 A2 | 10/1993 | European Pat. Off. | H04L 12/46 |

(List continued on next page.)

OTHER PUBLICATIONS

Chowdhury, et al., "Alternative Bandwidth Allocation Algorithms for Packet Video in ATM Networks," INFOCOM 1992, pp. 1061–1068.

Doeringer, W., "Routing on Longest–Matching Prefixes," IEEE/ACM Transactions in Networking, vol. 4, No. 1, Feb. 1996, pp. 86–97.

Esaki, et al., "Datagram Delivery in an ATM–Internet," 2334b IEICE Transactions on Communications, Mar. 1994, No. 3, Tokyo, Japan.

(List continued on next page.)

Primary Examiner—Mehmet B. Geckil

[57] ABSTRACT

A method and system for providing a virtual interface between a router and a network, in which the router is not connected to the network using a local interface. A method and system in which a router may be dynamically decoupled from a first network and coupled to a second network, without losing state information associated with the coupling to either network. The router comprises a virtual interface to the network, at which state information for the physical interface to the network is recorded, and a binding between the virtual interface and a physical interface, the latter of which is coupled to the network. Dynamic binding of the virtual interface to the physical interface comprises an authentication step. A method and system in which a router can be dynamically coupled to one of a plurality of local networks of differing types, such as one local network using an ethernet technique and one local network using a token ring technique. The router comprises one virtual interface for each local network interface, a physical interface comprising a PC Card (PCMCIA card) controller, and one PC Card (PCMCIA card) network interface. A router is dynamically coupled to and decoupled from a set of networks sequentially, so that an administrator or an administrative program at the router may issue administrative and/or set-up commands to each of the networks. The administrative commands comprise configuration commands, so that an administrator may configure a plurality of networks from a single source location.

7 Claims, 3 Drawing Sheets

U.S. PATENT DOCUMENTS

| | | | |
|---|---|---|---|
| 4,499,576 | 2/1985 | Fraser | 370/60 |
| 4,506,358 | 3/1985 | Montgomery | 370/60 |
| 4,507,760 | 3/1985 | Fraser | 365/221 |
| 4,532,626 | 7/1985 | Flores et al. | 370/85 |
| 4,644,532 | 2/1987 | George et al. | 370/94 |
| 4,646,287 | 2/1987 | Larson et al. | 370/60 |
| 4,677,423 | 6/1987 | Benvenuto et al. | 340/347 DD |
| 4,679,227 | 7/1987 | Hughes-Hartogs | 379/98 |
| 4,723,267 | 2/1988 | Jones et al. | 379/93 |
| 4,731,816 | 3/1988 | Hughes-Hartogs | 379/98 |
| 4,750,136 | 6/1988 | Arpin et al. | 364/514 |
| 4,757,495 | 7/1988 | Decker et al. | 370/76 |
| 4,763,191 | 8/1988 | Gordon et al. | 358/86 |
| 4,769,810 | 9/1988 | Eckberg, Jr. et al. | 370/60 |
| 4,769,811 | 9/1988 | Eckberg, Jr. et al. | 370/60 |
| 4,771,425 | 9/1988 | Baran et al. | 370/85 |
| 4,819,228 | 4/1989 | Baran et al. | 370/85 |
| 4,827,411 | 5/1989 | Arrowood et al. | 364/300 |
| 4,833,706 | 5/1989 | Hughes-Hartogs | 379/98 |
| 4,835,737 | 5/1989 | Herrig et al. | 364/900 |
| 4,879,551 | 11/1989 | Georgiou et al. | 340/825.87 |
| 4,893,306 | 1/1990 | Chao et al. | 340/94.2 |
| 4,903,261 | 2/1990 | Baran et al. | 370/94.2 |
| 4,922,486 | 5/1990 | Lidinsky et al. | 370/60 |
| 4,933,937 | 6/1990 | Konishi | 370/85.13 |
| 4,960,310 | 10/1990 | Cushing | 350/1.7 |
| 4,962,497 | 10/1990 | Ferenc et al. | 370/60.1 |
| 4,962,532 | 10/1990 | Kasiraj et al. | 380/25 |
| 4,965,772 | 10/1990 | Daniel et al. | 364/900 |
| 4,970,678 | 11/1990 | Sladowski et al. | 364/900 |
| 4,980,897 | 12/1990 | Decker et al. | 375/38 |
| 4,991,169 | 2/1991 | Davis et al. | 370/77 |
| 5,003,595 | 3/1991 | Collins et al. | 380/23 |
| 5,014,265 | 5/1991 | Hahne et al. | 370/60 |
| 5,020,058 | 5/1991 | Holden et al. | 370/109 |
| 5,033,076 | 7/1991 | Jones et al. | 379/67 |
| 5,054,034 | 10/1991 | Hughes-Hartogs | 375/8 |
| 5,059,925 | 10/1991 | Weisbloom | 331/1 A |
| 5,072,449 | 12/1991 | Enns et al. | 371/37.1 |
| 5,088,032 | 2/1992 | Bosack | 395/200 |
| 5,115,431 | 5/1992 | Williams et al. | 370/94.1 |
| 5,128,945 | 7/1992 | Enns et al. | 371/37.1 |
| 5,136,580 | 8/1992 | Videlock et al. | 370/60 |
| 5,166,930 | 11/1992 | Braff et al. | 370/94.1 |
| 5,199,049 | 3/1993 | Wilson | 375/104 |
| 5,206,886 | 4/1993 | Bingham | 375/97 |
| 5,212,686 | 5/1993 | Joy et al. | 370/60 |
| 5,224,099 | 6/1993 | Corbalis et al. | 370/94.2 |
| 5,226,120 | 7/1993 | Brown et al. | 395/200 |
| 5,228,062 | 7/1993 | Bingham | 375/97 |
| 5,229,994 | 7/1993 | Balzano et al. | 370/85.13 |
| 5,237,564 | 8/1993 | Lespagnol et al. | 370/60.1 |
| 5,241,682 | 8/1993 | Bryant et al. | 395/800 |
| 5,243,342 | 9/1993 | Kattemalalavadi et al. | 341/106 |
| 5,243,596 | 9/1993 | Port et al. | 370/94.1 |
| 5,247,516 | 9/1993 | Bernstein et al. | 370/82 |
| 5,249,178 | 9/1993 | Kurano et al. | 370/60 |
| 5,255,291 | 10/1993 | Holden et al. | 375/111 |
| 5,260,933 | 11/1993 | Rouse | 370/14 |
| 5,260,978 | 11/1993 | Fleischer et al. | 375/106 |
| 5,268,592 | 12/1993 | Bellamy et al. | 307/43 |
| 5,268,900 | 12/1993 | Hluchyj et al. | 370/94.1 |
| 5,271,004 | 12/1993 | Proctor et al. | 370/60 |
| 5,274,631 | 12/1993 | Bhardwaj | 370/60 |
| 5,274,635 | 12/1993 | Rahman et al. | 370/60.1 |
| 5,274,643 | 12/1993 | Fisk | 370/94.1 |
| 5,280,470 | 1/1994 | Buhrke et al. | 370/13 |
| 5,280,480 | 1/1994 | Pitt et al. | 370/85.13 |
| 5,280,500 | 1/1994 | Mazzola et al. | 375/17 |
| 5,283,783 | 2/1994 | Nguyen et al. | 370/16.1 |
| 5,287,103 | 2/1994 | Kasprzyk et al. | 340/825.52 |
| 5,291,482 | 3/1994 | McHarg et al. | 370/60 |
| 5,305,311 | 4/1994 | Lyles | 370/60 |
| 5,307,343 | 4/1994 | Bostica et al. | 370/60 |
| 5,311,509 | 5/1994 | Heddes et al. | 370/60 |
| 5,313,454 | 5/1994 | Bustini et al. | 370/13 |
| 5,313,582 | 5/1994 | Hendel et al. | 395/250 |
| 5,317,562 | 5/1994 | Nardin et al. | 370/16 |
| 5,319,644 | 6/1994 | Liang | 370/85.5 |
| 5,327,421 | 7/1994 | Hiller et al. | 370/60.1 |
| 5,331,637 | 7/1994 | Francis et al. | 370/54 |
| 5,345,445 | 9/1994 | Hiller et al. | 370/60.1 |
| 5,345,446 | 9/1994 | Hiller et al. | 370/60.1 |
| 5,359,592 | 10/1994 | Corbalis et al. | 370/17 |
| 5,361,250 | 11/1994 | Nguyen et al. | 370/16.1 |
| 5,361,256 | 11/1994 | Doeringer et al. | 370/60 |
| 5,361,259 | 11/1994 | Hunt et al. | 370/84 |
| 5,365,524 | 11/1994 | Hiller et al. | 370/94.2 |
| 5,367,517 | 11/1994 | Cidon et al. | 370/54 |
| 5,371,852 | 12/1994 | Attanasio et al. | 395/200 |
| 5,386,567 | 1/1995 | Lien et al. | 395/700 |
| 5,390,170 | 2/1995 | Sawant et al. | 370/58.1 |
| 5,390,175 | 2/1995 | Hiller et al. | 370/60 |
| 5,394,394 | 2/1995 | Crowther et al. | 370/60 |
| 5,394,402 | 2/1995 | Ross | 370/94.1 |
| 5,400,325 | 3/1995 | Chatwani et al. | 370/60.1 |
| 5,408,469 | 4/1995 | Opher et al. | 370/60.1 |
| 5,416,842 | 5/1995 | Aziz | 380/30 |
| 5,422,880 | 6/1995 | Heitkamp et al. | 370/60 |
| 5,422,882 | 6/1995 | Hiller et al. | 370/60.1 |
| 5,423,002 | 6/1995 | Hart | 395/200 |
| 5,426,636 | 6/1995 | Hiller et al. | 370/60.1 |
| 5,428,607 | 6/1995 | Hiller et al. | 370/60.1 |
| 5,430,715 | 7/1995 | Corbalis et al. | 370/54 |
| 5,442,457 | 8/1995 | Najafi | 358/400 |
| 5,442,630 | 8/1995 | Gagliardi et al. | 370/85.13 |
| 5,452,297 | 9/1995 | Hiller et al. | 370/60.1 |
| 5,473,599 | 12/1995 | Li et al. | 370/16 |
| 5,473,607 | 12/1995 | Hausman et al. | 370/85.13 |
| 5,485,455 | 1/1996 | Dobbins et al. | 370/60 |
| 5,491,687 | 2/1996 | Christensen et al. | 370/17 |
| 5,491,804 | 2/1996 | Heath et al. | 395/275 |
| 5,509,006 | 4/1996 | Wilford et al. | 370/60 |
| 5,519,704 | 5/1996 | Farinacci et al. | 370/85.13 |
| 5,526,489 | 6/1996 | Nilakantan et al. | 395/200.12 |
| 5,530,963 | 6/1996 | Moore et al. | 395/200.15 |
| 5,535,195 | 7/1996 | Lee | 370/54 |
| 5,555,244 | 9/1996 | Gupta et al. | 370/60 |
| 5,561,669 | 10/1996 | Lenney et al. | 370/60.1 |
| 5,583,862 | 12/1996 | Callon | 370/397 |
| 5,592,470 | 1/1997 | Rudrapatna et al. | 370/320 |
| 5,598,581 | 1/1997 | Daines et al. | 395/872 |
| 5,604,868 | 2/1997 | Komine et al. | 395/200 |
| 5,617,417 | 4/1997 | Sathe et al. | 370/394 |
| 5,617,421 | 4/1997 | Chin et al. | 370/402 |
| 5,632,021 | 5/1997 | Jennings et al. | 395/309 |
| 5,634,010 | 5/1997 | Ciscon et al. | 395/200 |
| 5,644,718 | 7/1997 | Belove et al. | 395/200 |
| 5,666,353 | 9/1997 | Klausmeier et al. | 370/17 |
| 5,673,265 | 9/1997 | Gupta et al. | 370/432 |
| 5,678,006 | 10/1997 | Valizadeh et al. | 395/200.02 |

FOREIGN PATENT DOCUMENTS

| | | | |
|---|---|---|---|
| WO 93/07569 | 4/1993 | WIPO | G06F 13/40 |
| WO 93/07692 | 4/1993 | WIPO | H04J 3/24 |
| 9401828 | 1/1994 | WIPO | 15/40 |
| WO 94/01828 | 1/1994 | WIPO | G06F 13/40 |
| WO 95/20850 | 8/1995 | WIPO | H04L 12/56 |

OTHER PUBLICATIONS

IBM Corporation, "Method and Apparatus for the Statistical Multiplexing of Voice, Data and Image Signals," IBM Technical Disclosure Bulletin, No. 6, Nov. 1992, pp. 409–411.

Pei, et al., "Putting Routing Tables in Silicon," IEEE Network Magazine, Jan. 1992, pp. 42–50.

Tsuchiya, P.F., "A Search Algorithm for Table Entries with Non–contiguous Wildcarding,", Abstract, Bellcore.

Zhang, et al., "Rate–Controlled Static–Priority Queueing," INFOCOM 1993,pp. 227–236.

Application Serial No. 08/081,646, "Message Header Classifier," William R. Crowther et al.

Pei, Tong–Bi & Zukowski, Charles, "Putting Routing Tables in Silicon;" IEEE Network Magazine, Jan. 1992.

Tsuchiya, Paul F., "A Search Algorithm for Table Entries with Non–contiguous Wildcarding.".

Donald Becker, "3c589,c: A 3c589 EtherLink 3 Ethernet Driver for Linux",Becker@CESDIS.gsfc.nasa.gov, May 3, 1994, pp. 1–13.

W. Simpson, "The Point–to–Point Protocol (PPP)", Network Working Group, RFC 1548, Dec. 1993 pp. 1–53.

D. Perkins "Requirements for Internet Standard Point–to–Point Protocol", Network Working Group, RFC 1547, Dec. 1993, pp. 1–19.

M. Allen, "Novell IPX Over Various WAN Media (IPX-WAN)", Network Working Group, RFC 1551, Dec. 1993 pp. 1–22.

VIRTUAL INTERFACES WITH DYNAMIC BINDING

CROSS-REFERENCE TO RELATED APPLICATION

This is a file-wrapper continuation of Patent Application Ser. No. 08/367,050, filed Dec. 29, 1994 now abandoned.

BACKGROUND OF THE INVENTION

1. Field of the Invention

This invention relates to virtual interfaces with dynamic binding in a computer network environment.

2. Description of Related Art

In a computer network environment, it is often desirable to couple a local area network to a device remote from that local area network. When the local area network uses a protocol such as ethernet or token ring, devices to be coupled to the local area network generally require a network interface card or a similar device to establish connectivity. However, for a device remote from the local area network, a communication link to the locality of the local area network, such as a serial link, is generally required to establish connectivity. Providing connectivity between a local area network and a remote is a problem which has arisen in the art.

For example, it is often desirable to couple a local area network to a router for connection to a second network. In this manner, the local area network can achieve connectivity with a network of networks (an internetwork) using the router. However, when the router is physically remote from the local area network, connectivity between the router and the local area network generally requires a communication link, such as a serial communication link, which complicates the connection between the router and the local area network.

One method in the art is to provide connectivity between the router and the local area network using a higher-level protocol, such as the TCP/IP protocol. Devices coupled to the local area network would then be able to communicate with networks coupled to the router, using the TCP/IP protocol or applications founded thereon. However, while this method provides connectivity between the router and the local area network, it requires additional complexity and additional processing for such accesses, and does not truly allow routing packets over the serial connection as if it were a local area network connection. This additional complexity and failure to truly emulate a local area network connection may also degrade or disable the use at the router of applications designed for local area networks, even though the router is thereby coupled to the local area network.

In addition to connectivity, it is often desirable to couple a local area network to a remote location so as to provide services to the local area network from that remote location. For example, it may be advantageous to centralize administrative services for a plurality of local area networks which are remote from each other. However, the additional complexity of using a higher-level protocol introduces additional complexity and inconvenience to provision of those administrative services to the local area network.

More generally, it is often desirable to substitute a different type of physical device interface while maintaining the same type of logical connectivity. For example, portable laptop or notebook computers often provide a PCMCIA or "smart card" interface, to which one of several types of devices may be coupled. Some of these PCMCIA cards provide connectivity to a local area network, but may require a special software controller for the PCMCIA-based network interface. It would be advantageous to provide a method and system in which a software controller for the network interface could operate independent of which type of PCMCIA card is used to provide physical connectivity.

Accordingly, it is an object of the invention to provide improved connectivity to networks.

SUMMARY OF THE INVENTION

The invention provides a method and system for providing a virtual interface between a router and a network, in which the router is not connected to the network using a local interface. The invention also provides a method and system in which a router may be dynamically decoupled from a first network and coupled to a second network, without losing state information associated with the coupling to either network. In a preferred embodiment, the router comprises a virtual interface to the network, at which state information for the physical interface to the network is recorded, and a binding between the virtual interface and a physical interface, the latter of which is coupled to the network. In a preferred embodiment, dynamic binding of the virtual interface to the physical interface comprises an authentication step.

In a second aspect, the invention provides a method and system in which a router can be dynamically coupled to one of a plurality of local networks of differing types, such as one local network using an ethernet technique and one local network using a token ring technique. In this second aspect, the router comprises one virtual interface for each local network interface, a physical interface comprising a PC Card (PCMCIA card) controller, and one PC Card (PCMCIA card) network interface.

In a third aspect, a router is dynamically coupled to and decoupled from a set of networks sequentially, so that an administrator or an administrative program at the router may issue administrative and/or set-up commands to each of the networks. In a preferred embodiment, the administrative commands comprise configuration commands, so that an administrator may configure a plurality of networks from a single source location.

DESCRIPTION OF THE PREFERRED EMBODIMENT

In the following description, a preferred embodiment of the invention is described with regard to preferred process steps and data structures. However, those skilled in the art would recognize, after perusal of this application, that embodiments of the invention may be implemented using a set of general purpose computers operating under program control, and that modification of a set of general purpose computers to implement the process steps and data structures described herein would not require invention or undue experimentation.

GENERAL FEATURES OF THE METHOD AND SYSTEM

Figure 1:
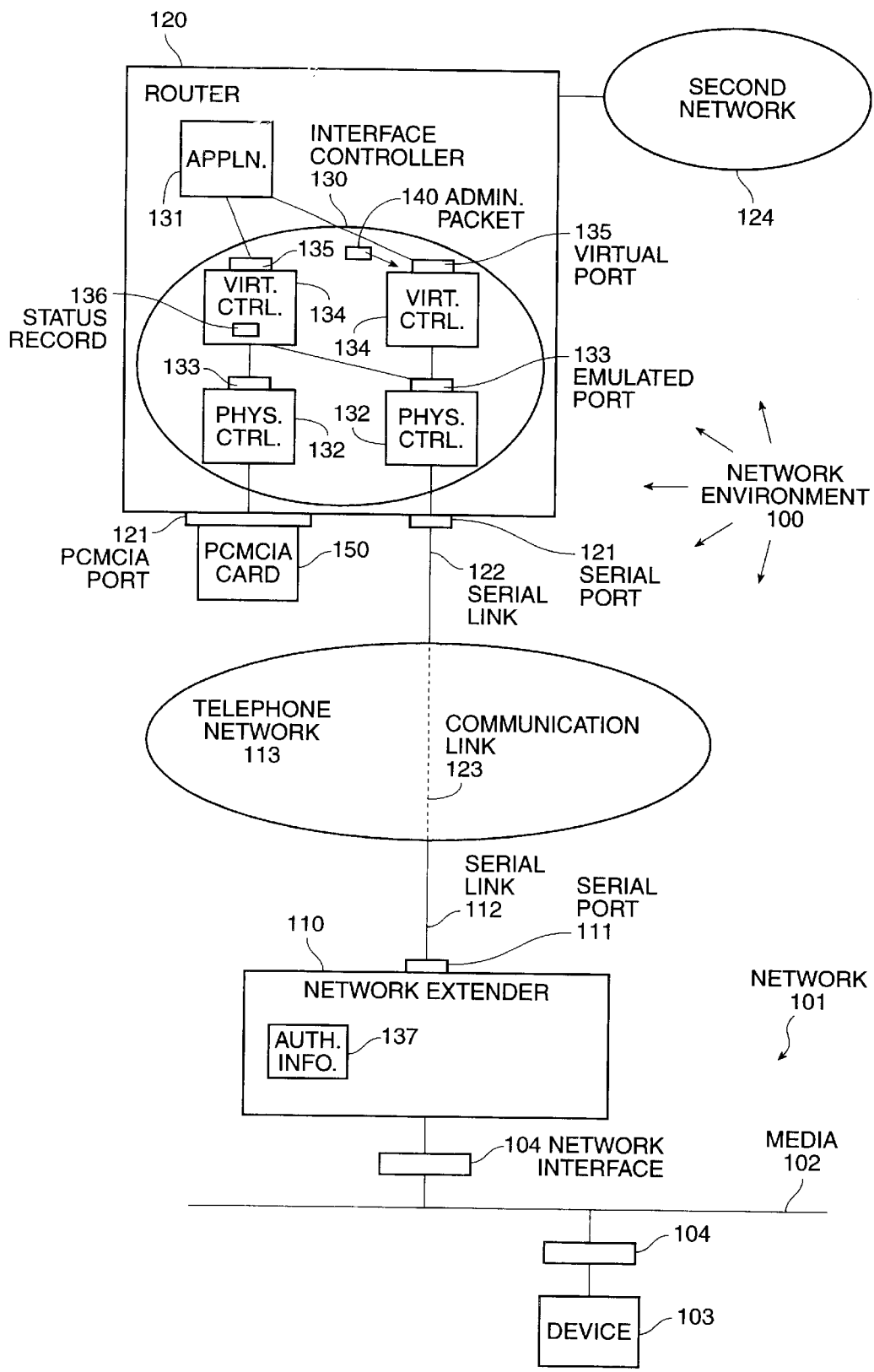
FIG. 1 shows a block diagram of a computer network environment including a router and a distant network.

FIG. 1 shows a block diagram of a computer network environment including a router and a distant network.

In a computer network environment 100, a network 101 comprises a communication medium 102 and at least one device 103 coupled thereto, using a network interface 104. (Typically, more than one device 103 is coupled to the network 101.) The network 101 may comprise a local area network ("LAN"), a wide area network ("WAN"), an internetwork, or a hybrid thereof. Local area networks, wide area networks and internetworks are known in the art of computer networking. For example, in preferred embodiments the network 101 may comprise either an ethernet LAN operating according to an ethernet protocol or a token ring LAN operating according to a token ring network protocol. Ethernet LANs, their communication media and network interfaces, as well as token ring LANs, their communication media and network interfaces, are known in the art of computer networking.

The Network Extender

The network 101 comprises a network extender 110 coupled to the communication medium 102 using a network interface 104. The network extender 110 comprises a special purpose processor or a general purpose processor operating under control of a program memory, and a data storage memory, and is disposed for connectivity to the network 101 using the network interface 104.

In a preferred embodiment, the network extender 110 comprises one of the "C1000 LAN Extender" products, available from cisco Systems, Inc., of San Jose, Calif., and is disposed to be configured for connectivity to an ethernet LAN or a token ring LAN.

Figure 2A:
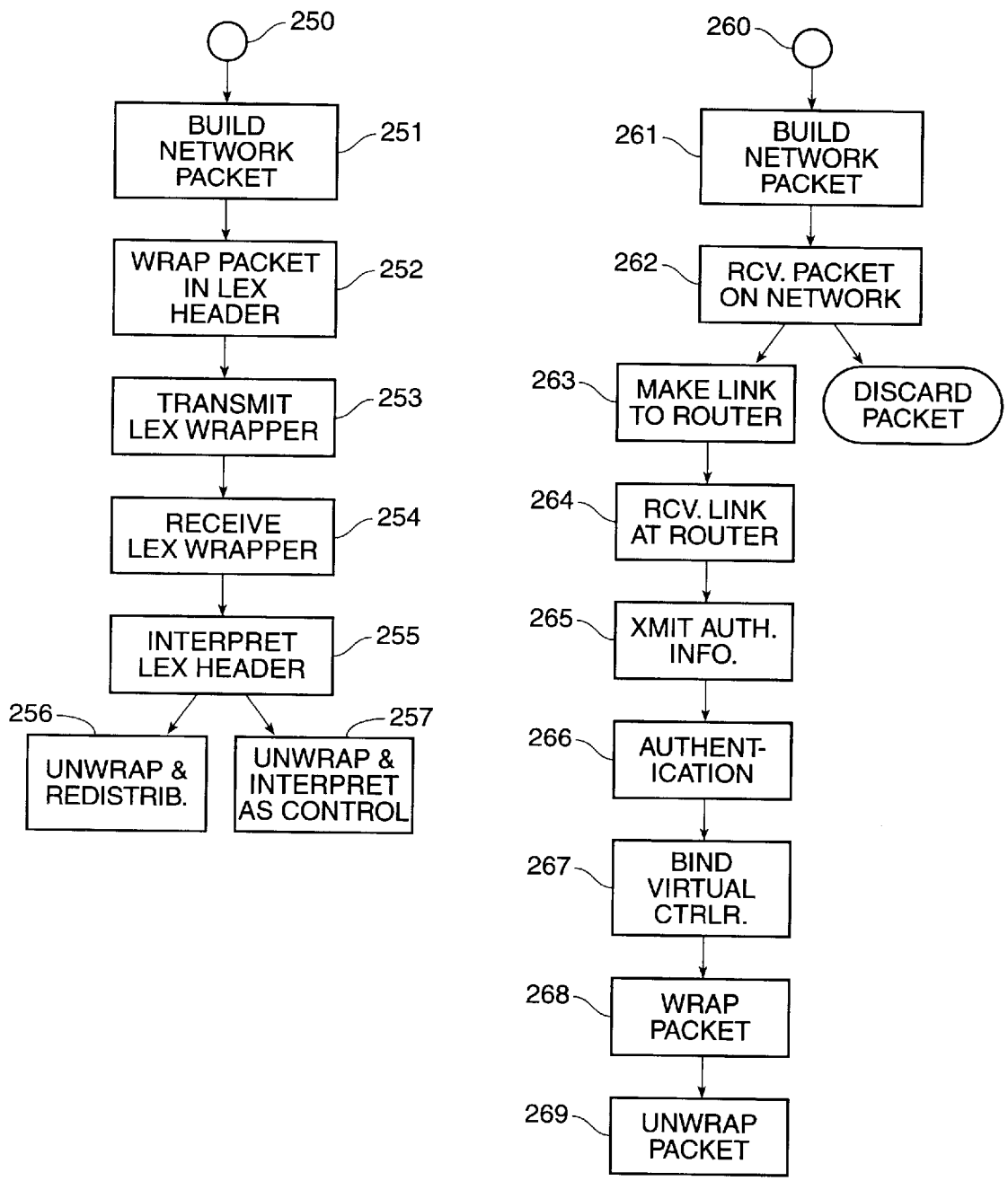
FIG. 2 shows a flow diagram of a method of communication between a router to a distant network, and data structures used therewith.
Figure 2B:
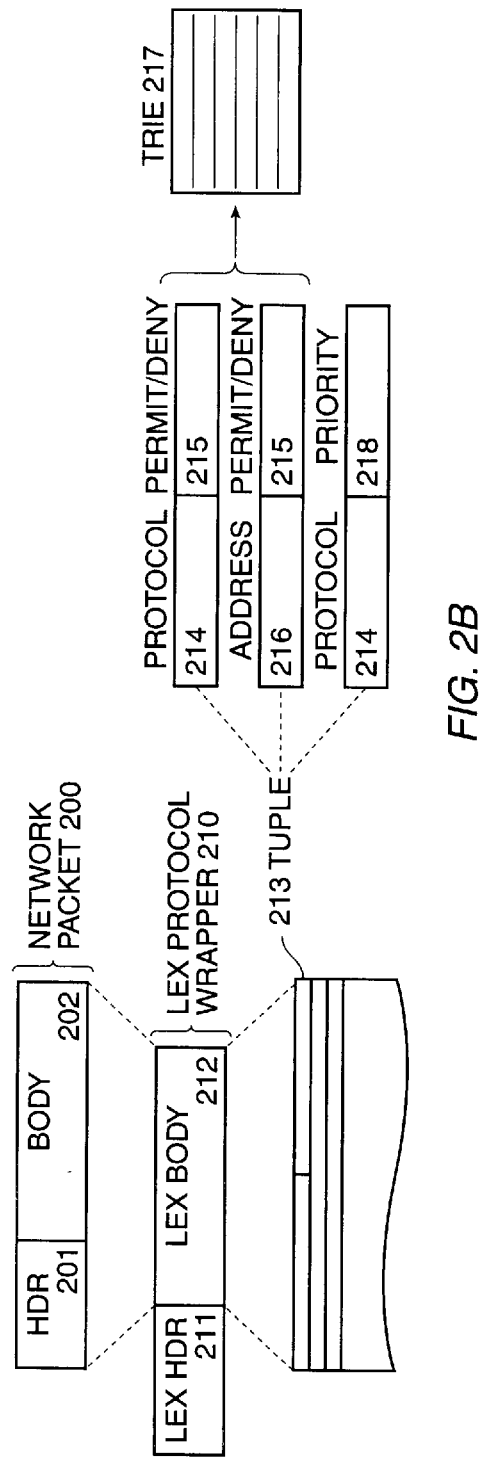

The network extender 110 is also coupled to a serial port 111, and is disposed for controlling the serial port 111 according to a known serial port protocol, preferably a point-to-point protocol like that described with FIG. 2. The serial port 111 is disposed for coupling to a serial communication link 112, such as a telephone line coupled to a telephone network 113 or other network.

In a preferred embodiment, the serial port 111 is disposed to make a serial connection using the serial communication link 112 by either making a call on the telephone network 113 or receiving a call on the telephone network 113, using a telephone line modem or other technique for transmitting digital information using a telephone network. Serial communication using a telephone network is known in the art of computer communication.

The Router

A router 120, remote from the network 101, comprises a special purpose processor or a general purpose processor operating under control of a program memory, and a data storage memory. As used herein, the term "remote" refers to logical remoteness, and does not necessarily imply physical distance or another type of remoteness. Similarly, as used herein, the term "local" refers to logical locality, and does not necessarily imply physical closeness or another type of locality.

In a preferred embodiment, the router 120 comprises any cisco router product, available from cisco Systems, Inc., of San Jose, Calif.

The router 120 comprises a serial port 121, and is disposed for controlling the serial port 121 according to a known serial port protocol, preferably a point-to-point protocol like that described with FIG. 2. The serial port 121 is disposed for coupling to a serial communication link 122, such as a telephone line coupled to the same telephone network 113 or other network, similar to the serial port 111 and the serial communication link 112.

In a preferred embodiment, the serial port 121 is disposed to make a serial connection using the serial communication link 122 by either making a call on the telephone network 113 or receiving a call on the telephone network 113, using a telephone line modem or other technique for transmitting digital information using a telephone network, similar to the serial port 111 and the serial communication link 112.

The serial link 112 and the serial link 122 may be coupled to form a communication link 123, such as using a telephone virtual circuit on the network 113, so that serial communication between the two is possible.

In a preferred embodiment, the router 120 is coupled to one or more second networks 124, each of which may comprise a local area network, a wide area network ("WAN"), an internetwork, or a hybrid thereof. In preferred embodiments the second network 124 may comprise either a local area network or an internetwork, and the router 120 may be disposed for bridging, brouting, gatewaying or routing packets between the first network 101 and the second network 124. Bridging, brouting (i.e., operating as a brouter), gatewaying (i.e., operating as a gateway) and routing are known in the art of computer networking.

The Interface Controller

The router 120 comprises an interface controller 130 coupled to the serial port 121. In a preferred embodiment where the router 120 is a general purpose processor operating under software control, the interface controller 130 comprises device control software in the router's program memory and operates under the control of operating system software in the router's program memory. The interface controller 130 is disposed to control the serial port 121 and to couple the serial port 121 to an application 131 operating with the router 120. (The application 131 preferably implements a point-to-point protocol like that described with FIG. 2.) Coupling application software to a device under control of device control software is known in the art of computer operating systems.

The interface controller 130 comprises a physical controller 132, which is disposed for controlling the serial port 121, i.e., to receive status signals from the serial port 121, to transmit configuration signals to the serial port 121, and to transceive data signals between the serial port 121 and an emulated port 133.

In a preferred embodiment, the emulated port 133 is a software object comprising a set of methods which the physical controller 132 exports and which the virtual controller 134 inherits for construction of its virtual port 135. Software objects having exportable and inheritable methods are known in the art of computer programming.

The emulated port 133 is disposed for coupling, by the router's operating system software, to a virtual controller 134. The virtual controller 134 is disposed to couple the application 131 to the emulated port 133, i.e., to receive configuration signals from the application 131, to transmit status signals from the physical controller 132 at the emulated port 133, and to transceive data signals between the emulated port 133 and a virtual port 135.

The virtual port 135 provides the application 131 with the same interface as if the router 120 were coupled directly to the network 101 using a directly connected network interface 104. Accordingly, there is one type of virtual controller 134 for each type of network interface 104 to which the router 120 is disposed for coupling. In a preferred embodiment, the virtual controller 134 is configured for ethernet LANs operating according to an ethernet protocol. When a communication link 123 is established between a network extender 110 and the router 120, the router's operating system selects the virtual controller 134 matching the network extender 110 and its network 101 for coupling to the physical controller 132.

Dynamic Binding

In a preferred embodiment, the serial port 121 is disposed for dynamic binding to one of a plurality of serial ports 111, by sequentially making and breaking the communication link 123 between the router 120 and one of a plurality of network extenders 110. The plurality of network extenders 110 are preferably each coupled to a different network 101, so dynamic binding of the serial port 121 allows the router 120 to sequentially couple to one of a plurality of networks 101.

In a preferred embodiment, an operator sets up an initial configuration for the virtual controller 134, indicating which virtual controller 134 should be bound to which network extender 110, preferably matching the MAC address of the network extender 110 to the initial configuration for the virtual controller 134, such as an initial configuration for an ethernet LAN operating using an ethernet LAN protocol. The router's operating system creates one software instantiation of the virtual controller 134 for each matching network extender 110 to be coupled to the router 120. This allows each software instantiation of the virtual controller 134 to dispense with switching context when the communication link 123 is made or broken. Multiple software instantiations are known in the art of computer operating systems.

Each instantiation of the virtual controller 134 also maintains state information about the emulated port 133 and the first network 101, in a status record 136, as if the communication link 123 between the network extender's serial port 111 and the router's serial port 121 were continually coupled. Information in the status record 136 is maintained persistently across multiple sessions of the communication link 123. This information includes authentication/identification data 137 for the communication link 123, such as a unique identifier for the network extender 110. In a preferred embodiment, the authentication/identification data 137 comprises the MAC address for the device embodying the network extender 110 and is received from the network extender 110 when the communication link 123 is established.

In alternative embodiments, the authentication/identification data 137 may comprise different or additional information. For example, the authentication/identification data 137 may comprise an identifying serial number for the network extender 110. The authentication/identification data 137 may also comprise information for a more elaborate or secure method of authentication, such as a password.

The physical controller 132 is re-usable and rebindable to a new virtual controller 134 each time the communication link 123 is made or broken. In alternative embodiments, the physical controller 132 may also comprise a controller for a multichannel interface, i.e., a physical interface which abstracts a plurality of communication links 123, such as a communication link with a plurality of channels, separated by frequency division, time division, or another technique.

Network Administration

In a preferred embodiment, the application 131 is disposed to supply administrative services to the network 101 when the router 120 is coupled to the network extender 110. The application 131 supplies administrative control packets 140 to the virtual controller 134, which couples them to the emulated port 133 and the physical controller 132, which couples them to the serial port 121 and the serial link 122, which couples them using the communication link 123 to the serial link 112 and the serial port 111 at the network extender 110, which couples them to the network 101, all using a point-to-point protocol described with FIG. 2. On the network 101, the network extender 110 receives the administrative control packet 140 and processes it accordingly to effect a network administrative service.

Alternative Interface Devices

In alternative embodiments, a physical controller 132 may be disposed to control a physical interface different from the serial port 121. For example, in an alternative preferred embodiment, a PCMCIA port 121 is substituted for the serial port 121, and a physical controller 132 tailored to the PCMCIA port 121 is substituted for the physical controller 132 tailored to the serial port 121. The PCMCIA port 121 is disposed for being coupled to a PCMCIA card 150; the PCMCIA card 150 may comprise a network interface 104 for a network 101, or another device such as a flash memory, a hard disk drive, a modem, or a radio transceiver.

The virtual controller 134 may be coupled to the physical controller 132 for the PCMCIA port 121 while the PCMCIA port 121 is coupled to a PCMCIA card 150, so that the application 131 may be coupled to the PCMCIA card 150 using the interface provided by the virtual port 135.

In general, the physical controller 132 may comprise any form of connection between the router 120 and the network extender 110, or more generally, any form of connection between two devices, such as a serial port and a serial port controller, a PCMCIA port and a PCMCIA port controller, a computer backplane, or another form of connection. The virtual controller 134 may comprise any interface to the physical controller 132, such as an ethernet interface, a token ring interface, a PCMCIA interface, or another form of interface, and need not be constrained by the physical nature of the connection.

COMMUNICATION BETWEEN THE ROUTER AND THE NETWORK

FIG. 2 shows a flow diagram of a method of communication between a router to a distant network, and data structures used therewith.

At a flow point 250, the application 131 desires to send a network packet 200 onto the network 101.

At a step 251, the router 120 builds the network packet 200, comprising a packet header 201 and a packet body 202. The packet header 201 comprises a destination address for a device 103 on the network 101; the packet body 202 comprises a sequence of data intended for the destination addressee device 103.

In a preferred embodiment, the network packet 200 comprises either an ethernet LAN packet, constructed according to an ethernet LAN protocol, or a token ring LAN packet, constructed according to a token ring LAN protocol. Both ethernet LAN protocols and token ring LAN protocols are known in the art.

At a step 252, the router 120 wraps the packet 200 in a LEX protocol wrapper 210, comprising a LEX header 211 and a LEX body 212. The LEX protocol is the protocol used by the router 120 for communication with the network extender 110 using the communication link 123. The LEX body 212 comprises either a sequence of data for the network extender 110 to redistribute onto the network 101 (that is, a network packet 200), or may comprise a control message designated for the network extender 110 itself.

At a step 253, the router 120 transmits the LEX protocol wrapper 210 to the network extender 110 using the communication link 123.

At a step 254, the network extender 110 receives the LEX protocol wrapper 210 using the communication link 123. The network extender 110 detects the LEX header 211 and separates the LEX header 211 from the LEX body 212.

At a step 255, the network extender 110 interprets the LEX header 211, which designates the LEX body 212 as intended for redistribution onto the network 101 (that is, a network packet 200), or as intended as a control message designated for the network extender 110 itself. If the LEX body 212 is a network packet 200, the network extender 110 proceeds to the step 256. Otherwise, the network extender 110 proceeds to the step 257.

At a step 256, the network extender 110 unwraps the LEX header 211 from the LEX protocol wrapper 210, and redistributes the LEX body 212 as a network packet 200 onto the network 101 using the network interface 104. The network's communication medium 102 transmits the network packet 200 to its destination device 103 (or devices 103, for example if the network packet 200 is a broadcast packet).

At a step 257, the network extender 110 unwraps the LEX header 211 from the LEX protocol wrapper 210, and interprets the LEX body 212 as a control message.

The following set of control messages comprises a set for a network extender 110 coupled to an ethernet LAN and operating according to an ethernet LAN protocol. In alternative embodiments, or with alternative network extenders 110 coupled to alternative networks 101, there might be a different set of control messages, or no control messages. For example, when the physical controller 132 is coupled to a PCMCIA card 150, there might be no control messages implemented at all.

A first control message comprises a negotiation control message for directing the network extender 110 to negotiate a set of parameters for establishing the communication link 123. The negotiation control message comprises a protocol version value, indicating the version of the LEX protocol supported by the router 120. The network extender 110 receives the protocol version value and responds with a negotiation control message indicating the version of the LEX protocol it supports. The router 120 and the network extender 110 each adjust their treatment of the communication link 123 to use the lower-numbered version of the LEX protocol.

A second control message comprises a protocol filtering control message for directing the network extender 110 to filter network packets 200 for those packets it should forward to the router 120 and those packets it should not forward. The protocol filtering control message comprises a sequence of tuples 213, in a canonical order, each tuple 213 comprising a protocol type 214 and a permit/deny bit 215 indicating whether a network packet 200 having that protocol type 214 should be forwarded or discarded. The sequence of tuples 213 is preceded by a sequence length field; a zero length sequence of tuples 213 is interpreted by the network extender 110 as a command to turn protocol filtering off.

A third control message comprises a destination filtering control message for directing the network extender 110 to filter network packets 200, similar to the protocol filtering control message. The destination filtering control message comprises a sequence of tuples 213, in a canonical order, each tuple 213 comprising a destination address 216 and a permit/deny bit 215 indicating whether a network packet 200 having that protocol type 214 should be forwarded or discarded. The sequence of tuples 213 is preceded by a sequence length field; a zero length sequence of tuples 213 is interpreted by the network extender 110 as a command to turn destination filtering off.

The network extender 110 parses the filtering control message and the destination filtering control message, and in response constructs a trie 217 embodying the instructions in the sequence of tuples 213 of protocol types 214 and permit/deny bits 215 or tuples 213 of destination addresses 216 and permit/deny bits 215. When the network extender 110 receives a network packet 200, as at the step 262, it matches the protocol type 215 and destination address 216 of the network packet 200 against the trie 217 to determine whether it should forward or discard the network packet 200.

In a preferred embodiment, the router 120 already comprises means for filtering packets 200 for those packets 200 it should forward to the network 101 and those packets 200 it should not forward, and does not generally require filtering information from the network extender 110.

A fourth control message comprises a priority queuing control message for directing the network extender 110 to prioritizing packets 200 to be queued for transmission to the router 120 using the communication link 123. The priority queuing control message comprises a sequence of tuples 213, in a canonical order, each tuple 213 comprising a protocol type 214 and a priority value 218 indicating what priority value to assign a network packet 200 having that protocol type 214. The sequence of tuples 213 is preceded by a sequence length field; a zero length sequence of tuples 213 is interpreted by the network extender 110 as a command to assign all packets the same priority value.

A fifth control message comprises a report statistics control message for directing the network extender 110 to respond with a report of operational statistics. The report statistics control message comprises a set of statistics flags, directing which statistics to report and directing the network extender 110 whether to reset those statistics upon reporting them.

In a preferred embodiment, the statistics flags comprise a first flag directing the network extender 110 to resent statistics after reporting, a second flag directing the network extender 110 to report statistics regarding the communication link 123, and a third flag directing the network extender 110 to report statistics regarding the network's communication medium 102. Statistics to be reported may comprise numbers of packets transmitted or received, errors of various types, latency times, transmission rates for packets or data, and other statistics known in the art of computer networking.

A sixth control message comprises a reboot control message for directing the network extender 110 to reboot itself.

A seventh control message comprises a download control message for directing the network extender 110 to download data comprising a program, a set of options, or other data.

An eighth control message comprises a download status control message for directing the network extender 110 to report status of a recent download control message.

A ninth control message comprises a disable network control message for directing the network extender 110 to disable its connectivity to the network 101.

A tenth control message comprises an enable network control message for directing the network extender 110 to enable its connectivity to the network 101.

An eleventh control message comprises an inventory control message for directing the network extender 110 to respond with a report of its hardware and software, including version numbers.

At a flow point 260, a device 103 on the network 101 desires to send a packet 200 to the router 120 (or to a destination device coupled to the router's second network 124).

At a step 261, the device 103 builds the network packet 200, comprising a packet header 201 and a packet body 202, and sends the network packet 200 on the network's communication medium 102. The packet header 201 comprises a destination address for the device 103 on the router's second network 124; the packet body 202 comprises a sequence of data intended for the destination addressee device 103.

At a step 262, the network extender 110 receives the network packet 200 using the network's communication medium 102. The network extender 110 detects the packet header 201 and determines whether the destination address is one it should forward to the router 120. If the destination address is one it should forward, the network extender 110 proceeds to the step 263. Otherwise, the network extender 110 discards the packet 200.

At a step 263, the network extender 110 attempt to make a communication link 123 with the router 120. If the network extender 110 already has a communication link 123 is progress with the router 120, the network extender 110 proceeds to the step 264. Otherwise, the network extender 110 establishes the communication link 123 with the router 120 using the telephone network 113. Establishing communication links using a telephone network is known in the art of computer communication.

At a step 264, the router 120 receives the incoming communication link 123 to the router's serial port 121. The router 120 negotiates with the network extender 110 to establish the communication link 123 with acceptable parameters (for example, line speed), using a negotiation control message described with the step 257. Negotiation to establish link parameters is known in the art of computer communication.

At a step 265, the network extender 110 transmits authentication information to the router 120 using the communication link 123. In a preferred embodiment, the authentication information is a MAC address for the network extender 110.

At a step 266, the router 120 receives the authentication/identification information and attempts to authenticate the network extender 110. If the router 120 is able to authenticate the network extender 110, it proceeds to the step 267. Otherwise, the router 120 so informs the network extender 110 and breaks the communication link 123.

In alternative embodiments, the step 265 and the step 266 may comprise a more elaborate or secure method of identification and authentication, such as PPP CHAP. For example, the step 266 may comprise a distinct authentication technique, and may comprise the exchange of information between the network extender 110 and the router 120 using the communication link 123. In such alternative embodiments, the router 120 attempts to identify and authenticate the network extender 110 before binding the virtual controller to the physical controller for the communication link 123 in the step 267.

At a step 267, the router 120 searches a lookup table for the virtual controller 134 associated with the network extender 110, and binds that virtual controller 134 to the physical controller 132 for the communication link 123. In a preferred embodiment, the MAC address for the network extender is associated with a single virtual controller 134. If no such virtual controller 134 exists (that is, the type of virtual port 135 is known but there is no instantiation of the virtual controller 134 for this particular network extender 110), the router 120 creates an instantiation of the associated virtual controller 134 and assigns that virtual controller 134 parameters for the communication link 123.

At a step 268, the network extender 110 wraps the network packet 200 in the LEX protocol wrapper 210, comprising a LEX header 211 and a LEX body 212, and transmits the LEX protocol wrapper 210 to the router 120 using the communication link 123. The LEX body 212 comprises the network packet 200.

At a step 269, the router 120 unwraps the LEX header 211 from the LEX protocol wrapper 210. The router 120 compares the LEX body 212 against an access list or a filter list to determine if the LEX body 212 should be forwarded to the second network 124. If so, the router 120 redistributes the LEX body 212 as a network packet 200 onto the second network 124, and the second network 124 transmits the network packet 200 to its destination device 103 (or devices 103, for example if the network packet 200 is a broadcast packet). Otherwise, the router 120 discards the LEX body 212.

The network extender 110 is also disposed to send a LEX protocol wrapper 210 comprising a LEX header 211 and a LEX body 212, where the LEX body 212 is a control message to the router 120 or a response to a control message from the router 120. When the LEX body 212 is a control message or a response to a control message, the router 120 detects this and does not forward the LEX body 212 onto the second network 124.

Alternative Embodiments

Although preferred embodiments are disclosed herein, many variations are possible which remain within the concept, scope, and spirit of the invention, and these variations would become clear to those skilled in the art after perusal of this application.

I claim:

1. A system for coupling a device to a network comprising
    a communication link between the device and a network interface;
    a router having a physical controller and a virtual controller, said physical controller having an emulated port and disposed for controlling said router serial port, and said virtual controller having a virtual port and disposed for coupling to said emulated port;
    wherein said physical controller is disposed to control said communication link;
    wherein said virtual controller is disposed to control said network interface, said virtual controller comprising state information for a connection between the device and the network;
    means for coupling said physical controller with said virtual controller, responsive to said connection;
    a network extender having a serial port and disposed for controlling the network extender's serial port, and operatively coupled to said network interface; and
    an application disposed to supply administrative services to the network when said router is coupled to said network extender, wherein said virtual controller is disposed to couple said application to said emulated port.

2. A system as in claim 1, comprising a second computer network coupled to said device; and means at said device for routing a packet from said network interface to said second computer network.

3. A system as in claim 1, comprising means for authenticating said connection between the device and the network after said communication link is established.

4. A system as in 1, comprising
    means for creating an administrative control message for a computer network;
    means for coupling said device to a first computer network and for transmitting said administrative control message to said network extender and means for coupling said device to second computer network and for transmitting said administrative control message to said network.

5. A system as in claim 1, wherein said network extender further comprises authentication information; and means for transmitting said authentication information to said device after said communication link is established.

6. A system as in claim 1, comprising means for creating an administrative control message;

means for coupling said device to a second network interface and for transmitting said administrative control message to a device coupled to said second network interface.

7. A system for dynamically coupling a device to one of a plurality of networks, comprising means for dynamically establishing a first communication link between the device and a first network interface, said first network interface being coupled to a first one of said plurality of networks;

means for dynamically establishing a second communication link between the device and a second network interface, said second network interface being coupled to a second one of said plurality of networks;

a router having a physical interface controller disposed to control said first communication link and said second communication link, a first virtual interface controller disposed to control said first network interface, and a second virtual interface disposed to control said second network interface;

wherein said second virtual interface controller comprises state information for a connection between the device and said second network;

a first network extender having a serial port and disposed for controlling said first network extender's serial port, and operatively coupled to said first network interface;

a second network extender having a serial port and disposed for controlling said second network extender's serial port, and operatively coupled to said second network interface; and means for establishing a binding between said physical interface controller and either said first or second virtual interface controller.

* * * * *